United States Patent
Agrawal et al.

(10) Patent No.: US 8,346,758 B2
(45) Date of Patent: Jan. 1, 2013

(54) METHOD AND SYSTEM FOR TRANSMITTING A QUERY IN A WIRELESS NETWORK

(75) Inventors: Dakshi Agrawal, Monsey, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 12/872,943

(22) Filed: Aug. 31, 2010

(65) Prior Publication Data

US 2012/0054172 A1 Mar. 1, 2012

(51) Int. Cl.
*G06F 7/00* (2006.01)
*G06F 17/30* (2006.01)

(52) U.S. Cl. ...... 707/713; 707/797; 370/328; 455/456.1

(58) Field of Classification Search .......... 707/713, 707/E17.017, E17.129, E17.069, 797, 769, 707/788; 370/328; 455/456.1
See application file for complete search history.

(56) References Cited

U.S. PATENT DOCUMENTS

| | | | |
|---|---|---|---|
| 6,826,564 B2 | 11/2004 | Thompson et al. | |
| 7,024,414 B2 | 4/2006 | Sah et al. | |
| 7,715,308 B2 * | 5/2010 | Ramaswamy | 370/217 |
| 2002/0073086 A1 * | 6/2002 | Thompson et al. | 707/10 |
| 2004/0203764 A1 * | 10/2004 | Hrastar et al. | 455/435.1 |
| 2006/0084410 A1 | 4/2006 | Sutaria et al. | |
| 2007/0242645 A1 * | 10/2007 | Stephenson et al. | 370/338 |
| 2008/0054072 A1 | 3/2008 | Katragadda et al. | |
| 2008/0077557 A1 | 3/2008 | Schneider et al. | |
| 2008/0172362 A1 * | 7/2008 | Shacham et al. | 707/3 |
| 2008/0307320 A1 * | 12/2008 | Payne et al. | 715/751 |
| 2009/0019013 A1 | 1/2009 | Tareen et al. | |
| 2009/0077054 A1 | 3/2009 | Muras et al. | |
| 2009/0086705 A1 * | 4/2009 | Zisimopoulos et al. | 370/347 |
| 2009/0268722 A1 * | 10/2009 | Gallagher et al. | 370/352 |
| 2009/0282122 A1 * | 11/2009 | Patel et al. | 709/207 |
| 2009/0319474 A1 | 12/2009 | Bestgen et al. | |
| 2010/0088315 A1 * | 4/2010 | Netz et al. | 707/737 |
| 2010/0118720 A1 * | 5/2010 | Gauvreau et al. | 370/252 |
| 2010/0284303 A1 * | 11/2010 | Catovic et al. | 370/254 |
| 2010/0296448 A1 * | 11/2010 | Vainikka et al. | 370/328 |
| 2010/0322151 A1 * | 12/2010 | Racz et al. | 370/328 |

OTHER PUBLICATIONS

Vladimir Vlassov, Dong Li, Konstantin Popov, and Seif Haridi—"A Scalable Autonomous Replica Management Framework for Grids"—IEEE John Vincent Atanasoff 2006 International Symposium on Modern Computing (JVA'06)—2006 IEEE—Oct. 3-6, 2006, (pp. 33-40).*

Ming Li—"Data Management and Wireless Transport for Large Scale Sensor Networks"—University of Massachusetts—Amherst ScholarWorks@UMass Amherst. Sep. 1, 2010, (pp. 1-110).*

(Continued)

*Primary Examiner* — Anh Ly (74) *Attorney, Agent, or Firm* — Preston J. Young, Esq.; McGinn IP Law Group, PLLC (57) ABSTRACT

A method of transmitting a query in a wireless network includes receiving a plurality of queries from a plurality of user equipments, aggregating the plurality of queries at a node of the network, the network including at least one of an access point of the network and an intermediate node of the network, and transmitting the aggregated plurality of queries to a query server.

21 Claims, 9 Drawing Sheets

OTHER PUBLICATIONS

Chow, et al., "Aggregate Location Monitoring for Wireless Sensor Networks: A Histogram-based Approach", Proceedings 2009, $10^{th}$ International Conference on Mobile Data Management: Systems, Services and Middleware, MDM 2009, pp. 1-10.

Deligiannakis, et al. "Hierarchical In-Network Data Aggregation with Quality Guarantees", Springer-Veriag Berlin Heidelberg, EDBT 2004, LNCS 2992, pp. 658-675.

Yao, et al., "Query Processing for Sensor Networks", Proceedings of the 2003 CIDER Conference, pp. 1-12.

Deligiannakis, et al., "Bandwidth-Constrained Queries in Sensor Networks", The VLDB Journal 2008, pp. 443-467.

Chow, et al., "Aggregate Location Monitoring for Wireless Sensors Networks: A Histogram-based Approach", Proceedings 2009, $10^{th}$ International Conference on Mobile Data Management: Systems, Services and Middleware, MDM 2009, pp. 1-10.

Sesia, et al. "LTE: The UMTS Long Term Evolution, From Theory to Practice", 2009, pp. 24-30.

* cited by examiner

| Querying Application | Period of Time (seconds) |
|---|---|
|  |  |
| A | 10 |
| B | 20 |
| C | 15 |
| D | 10 |
| E | 15 |
|  |  |
|  |  |

Figure 4A

| Access Point 220a - Querying Application A ||||||
|---|---|---|---|---|
| Query Number | Date of Transmission | Time of Transmission | Time that Window Closes | Aggregate Query Number |
| 220a-A1 | 6.21.10 | 8:55:20 | 8:55:30 | 3 |
| 220a-A2 | 6.21.10 | 8:55:22 | | 3 |
| 220a-A3 | 6.21.10 | 8:57:35 | 8:57:45 | 5 |
| 220a-A4 | 6.21.10 | 8:57:37 | | 5 |
| 220a-A5 | 6.21.10 | 8:57:41 | | 5 |
| | | | | |
| | | | | |

Figure 4B

| Access Point 220a - Querying Application B ||||||
|---|---|---|---|---|
| Query Number | Date of Transmission | Time of Transmission | Time that Window Closes | Aggregate Query Number |
| 220a-B1 | 6.21.10 | 8:55:25 | 8:55:45 | 4 |
| 220a-B2 | 6.21.10 | 8:55:39 | | 4 |
| 220a-B3 | 6.21.10 | 8:57:45 | 8:58:05 | 6 |
| 220a-B4 | 6.21.10 | 8:57:53 | | 6 |
| 220a-B5 | 6.21.10 | 8:57:55 | | 6 |
| 220a-B6 | 6.21.10 | 8:58:02 | | 6 |
| | | | | |

Figure 4C

| | Access Point 220b-Querying Application A | | | |
|---|---|---|---|---|
| Query Number | Date of Transmission | Time of Transmission | Time that Window Closes | Aggregate Query Number |
| 220b-A1 | 6.21.10 | 8:48:20 | 8:48:30 | 1 |
| 220b-A2 | 6.21.10 | 8:48:24 | | 1 |
| 220b-A3 | 6.21.10 | 8:59:05 | 8:59:15 | 8 |
| 220b-A4 | 6.21.10 | 8:59:07 | | 8 |
| 220b-A5 | 6.21.10 | 8:59:15 | | 8 |
| | | | | |
| | | | | |

Figure 4D

| | Access Point 220b - Querying Application B | | | |
|---|---|---|---|---|
| Query Number | Date of Transmission | Time of Transmission | Time that Window Closes | Aggregate Query Number |
| 220b-B1 | 6.21.10 | 8:54:10 | 8:54:30 | 2 |
| 220b-B2 | 6.21.10 | 8:54:24 | | 2 |
| 220b-B3 | 6.21.10 | 8:58:40 | 8:59:00 | 7 |
| | | | | |
| | | | | |
| | | | | |
| | | | | |

METHOD AND SYSTEM FOR TRANSMITTING A QUERY IN A WIRELESS NETWORK

BACKGROUND OF THE INVENTION

1. Field of the Invention

The present invention relates to a method of transmitting a query in a wireless network, and more particularly, a method which includes receiving a plurality of queries from a plurality of user equipments, and aggregating the plurality of queries at a node of the network (e.g., at a plurality of access points and intermediate nodes in the backhaul network).

2. Description of the Related Art

The rapid adoption and success of smart phone devices has accelerated the development of new wireless services through the hundreds of thousands of smart-phone applications. Besides traditional voice and plain data download and upload, the new applications have introduced new communication paradigms, and one such important paradigm is "information querying" by mobile devices.

For example, consider a navigation application running on smart phones which will need real-time updates of geographic map and real-time traffic information. The amount of information retrieved will depend on the subscription level of the user running the navigation application. This information (after being filtered) will need to be provided to many users of the cellular network, thus, requiring a significant bandwidth utilization.

Information querying by many mobile users will impose a significant bandwidth constraint on next generation cellular networks.

SUMMARY OF THE INVENTION

In view of the foregoing and other problems, disadvantages, and drawbacks of the aforementioned conventional systems and methods, an exemplary aspect of the present invention is directed to a method of transmitting a query in a wireless network which may optimize bandwidth consumption for queries (e.g., spatio-temporal queries) using query aggregation.

For example, an LTE (Long Term Evolution) network architecture may include user equipments (UEs) (e.g., handheld devices, laptops, etc.) that connect to access points (e.g., eNodeBs) which then connect to the backhaul core network. If two UEs, UE1 and UE2, connect to the same eNodeB and initiate queries Q1 and Q2 (e.g., a navigation map in the geographic vicinity of UE1 and UE2), then since UE1 and UE2 connect to the same eNodeB, they are spatially correlated and hence their navigation map queries Q1 and Q2 will have a significant overlap in the information being retrieved.

Currently, the LTE system does not have any provision to efficiently serve spatial and temporal queries. Under the current solution, each query will be served independently as a separate data flow (e.g., the wireless system may be unaware of (e.g., does not know) the actual data content). A drawback of such present solutions is that they are bandwidth inefficient.

For example, the overlapping information between queries Q1 and Q2 will be transported twice over the core network as well as the backhaul links between the core network and the eNodeBs, which are currently capacity bottlenecks. For a navigation application, queries will be issued by tens of UEs per cell and by hundreds of UEs per gateway node (P-GW) leading to significant bandwidth inefficiency.

The exemplary aspects of the present invention may address the issues of bandwidth inefficiency in conventional networks. In particular, an exemplary aspect of the present invention is directed to a method of transmitting a query in a wireless network. The method includes receiving a plurality of queries from a plurality of user equipments, aggregating the plurality of queries at a node of the network, the node including at least one of an access point of the network and an intermediate node of the network (e.g., at a plurality of access points and intermediate nodes), and transmitting the aggregated plurality of queries to a query server. The method may also include filtering the query response for serving the plurality of user equipments.

Another exemplary aspect of the present invention is directed to a wireless network including a plurality of user equipments for transmitting a plurality of queries, a query aggregator which aggregates the plurality of queries at a node of the network, the node including at least one of an access point of the network and an intermediate node of the network, and a query server which receives the aggregated plurality of queries. The intermediate node may transmit the aggregated plurality of queries to the query server. The network may also include a query filter (e.g., included within the query aggregator) for filtering the query response which is served to the plurality of user equipments Another exemplary aspect of the present invention is directed to a method of transmitting a query in a wireless network. The method includes receiving a plurality of queries from a plurality of user equipments, detecting a querying application which generates a query of the plurality of queries, setting a period of time based on a latency of the querying application, aggregating the plurality of queries at a node of the network over the period of time, the node including at least one of an access point in the network and an intermediate node of the network, (e.g., at a plurality of access points and intermediate nodes), transmitting the aggregated plurality of queries to a query server, retrieving data in response to the aggregated plurality of queries, and filtering the retrieved data and serving the filtered data to the plurality of user equipments.

Another exemplary aspect of the present invention is directed to a wireless network, including a plurality of user equipments for transmitting a plurality of queries, a plurality of access points and intermediate nodes at which queries are aggregated, a query aggregator for detecting a querying application which generates a query of the plurality of queries, setting a period of time based on a latency tolerance of the querying application, and aggregating the plurality of queries at a node of the network over the period of time, the node including at least one of an access point of the plurality of access points and an intermediate node of the network. The intermediate node includes a mobility management entity and serving gateway node which is connected to the plurality of access points and receives the plurality of queries from the access point, and a packet-gateway node which is connected to the mobility management entity and serving gateway node. The network also includes a core network including a query server which receives the aggregated plurality of queries from the packet-gateway node which serves as a gateway to the core network, the query server retrieving data in response to the aggregated plurality of queries and transmitting the retrieved data to the query aggregator which filters the retrieved data and serves the filtered data to the plurality of user equipments.

Another exemplary aspect of the present invention is directed to a programmable storage medium tangibly embodying a program of machine-readable instructions executable by a digital processing apparatus to perform a method of transmitting a query in a wireless network, the method including receiving a plurality of queries from a plurality of user equipments, aggregating the plurality of queries at a node of the network, the node including at least one of an access point of the network and an intermediate node of the network (e.g., at a plurality of access points and intermediate nodes), and transmitting the aggregated plurality of queries to a query server. The method may also include filtering the aggregated query response for serving the plurality of user equipments.

With its unique and novel features, the present invention provides a method of transmitting a query in a wireless network which may optimize bandwidth consumption over the backhaul links for queries (e.g., spatio-temporal queries) using query aggregation.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF THE EXEMPLARY EMBODIMENTS OF THE INVENTION

Referring now to the drawings, FIGS. 1-7 illustrate the exemplary aspects of the present invention.

Figure 1:
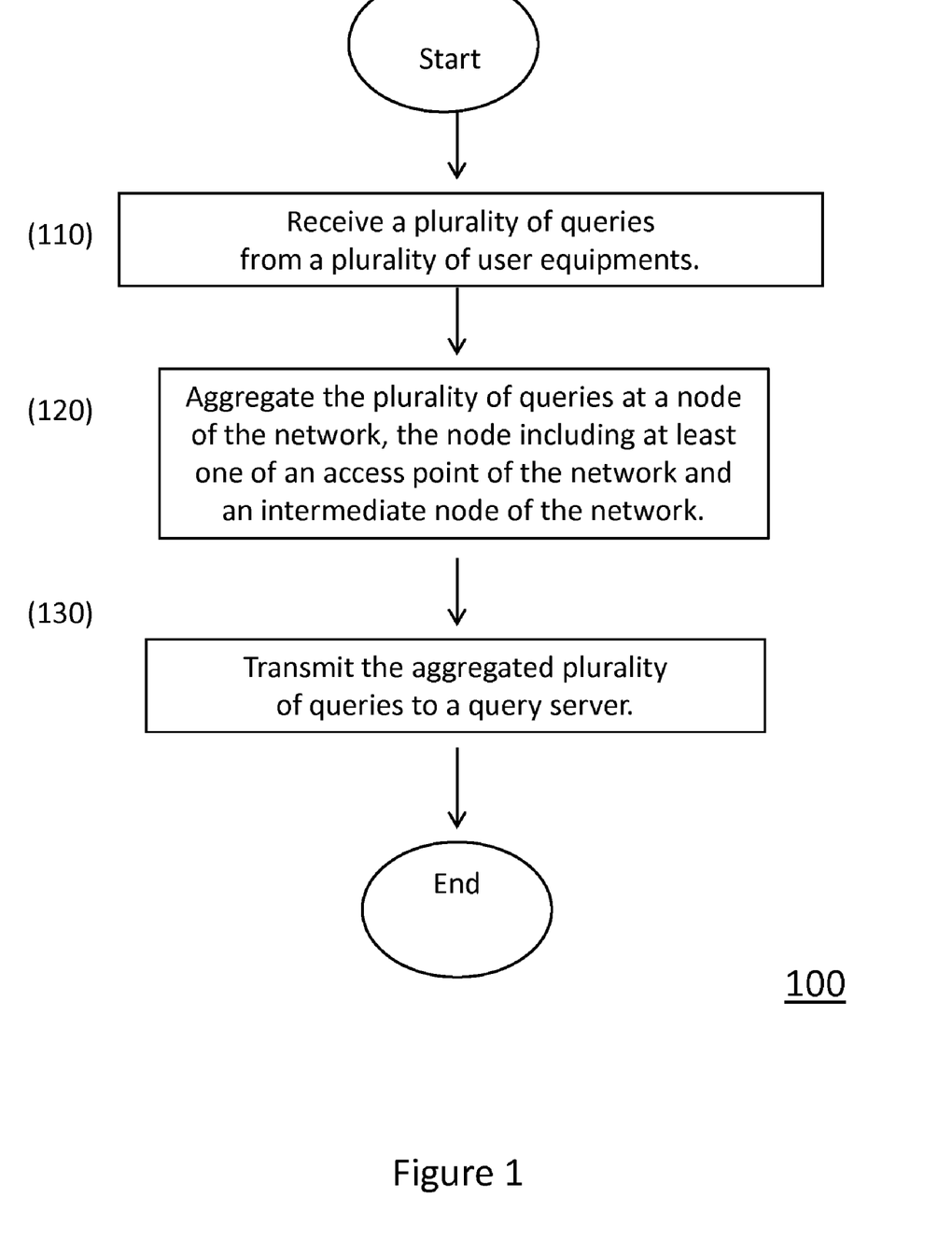
FIG. 1 illustrates a method 100 of transmitting a query in a wireless network, in accordance with an exemplary aspect of the present invention.

As illustrated in FIG. 1, an exemplary aspect of the present invention is directed a method 100 of transmitting a query in a wireless network. The method 100 includes receiving (110) a plurality of queries from a plurality of user equipments, aggregating (120) the plurality of queries at a node of the network, the node including at least one of an access point of the network and an intermediate node of the network (e.g., the network including a plurality of access points and intermediate nodes), and transmitting (130) the aggregated plurality of queries to a query server. The method 100 may also include receiving the response to the aggregated query and filtering the response which is served to the plurality of user equipments. For example, the aggregating of the plurality of queries may be based on an intensity of congestion in the network.

Figure 2A:
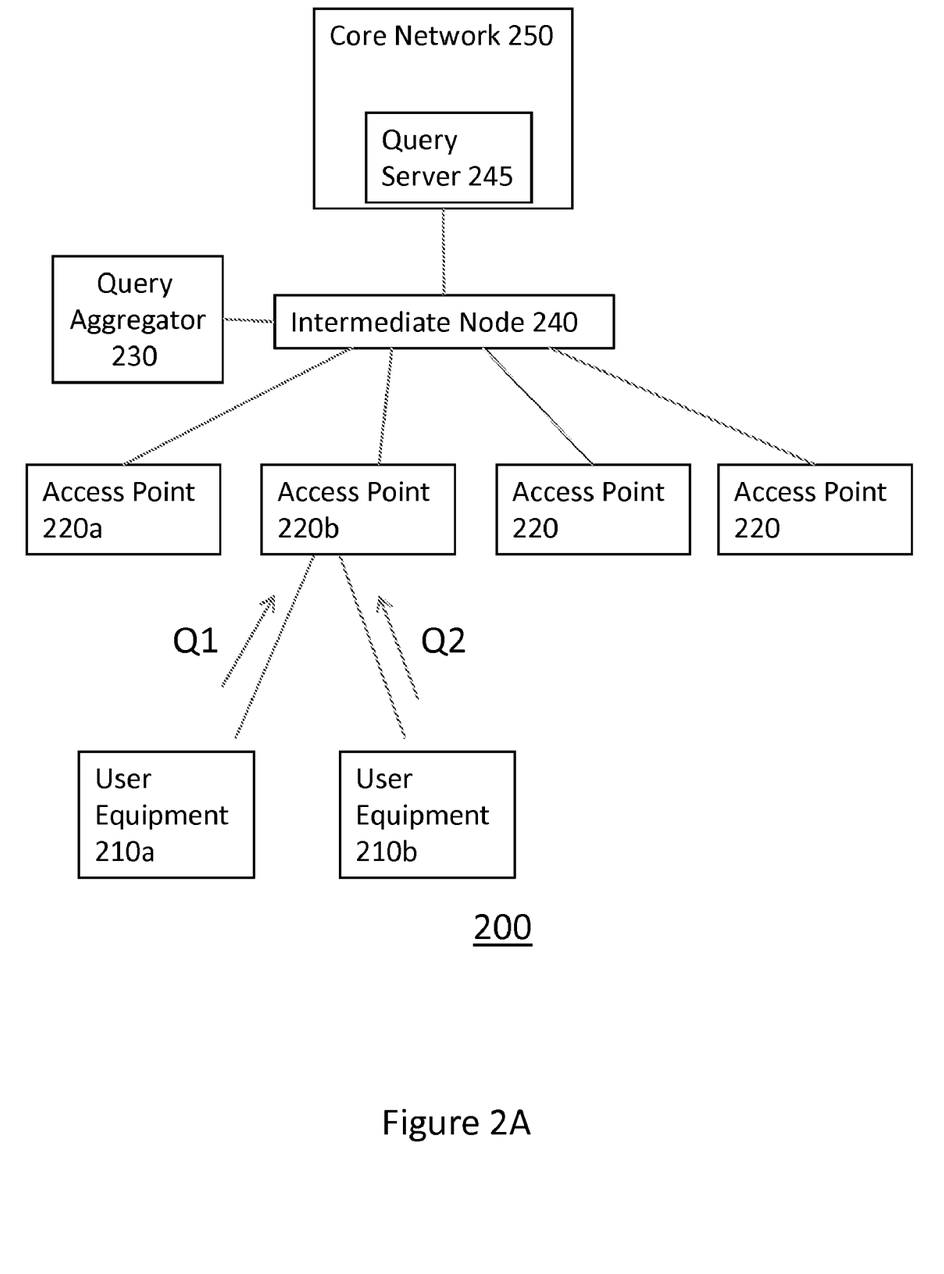
FIG. 2A illustrates a network 200, in accordance with an exemplary aspect of the present invention.

FIG. 2A illustrates a wireless network 200 according to another exemplary aspect of the present invention. The wireless network 200 includes a user equipment 210 (e.g., a plurality of user equipments 210a, 210b) for transmitting a plurality of queries (e.g., Q1, Q2), a query aggregator 230 for aggregating the plurality of queries at a node of the network, the node including at least one of an access point of the network and an intermediate node of the network (e.g., the network including a plurality of access points 220 and intermediate nodes 240), and a query server 245 which receives the aggregated plurality of queries.

The wireless network 200 includes a plurality of access points 220, including an access point 220 which serves the plurality of user equipments 210a, 210b. The network 200 may also include a core network 250 (e.g., core IP network) which includes the query server 245, the intermediate node 240 being formed between the plurality of access points 220 and the core network 250.

Figure 2B:
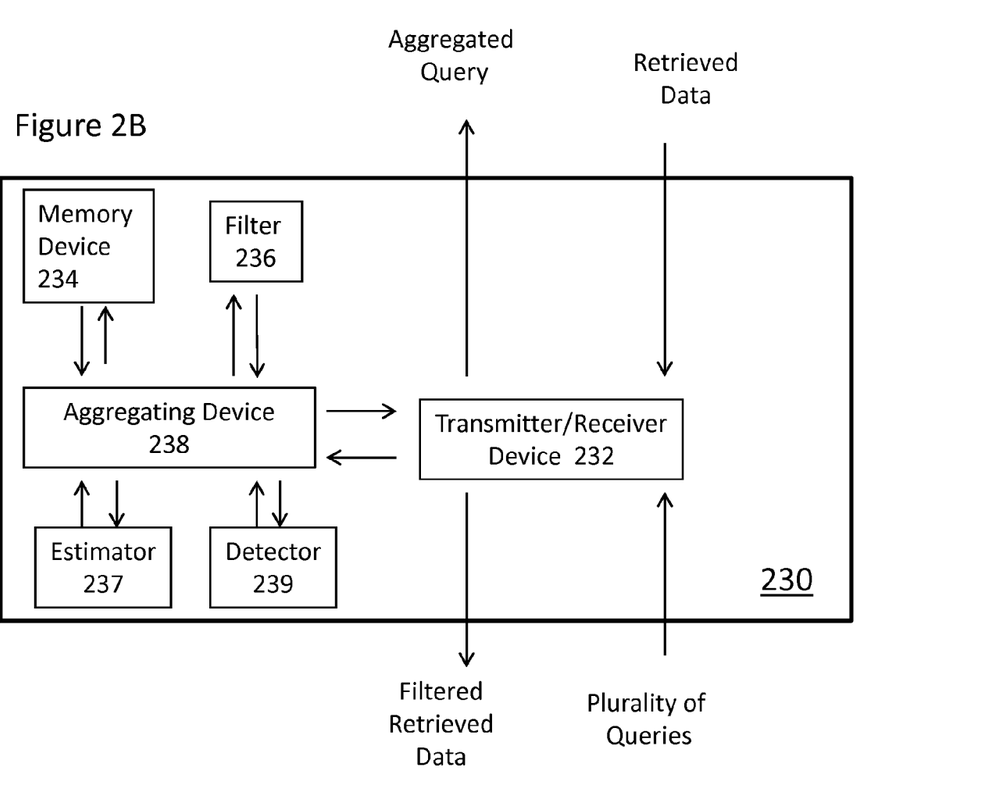
FIG. 2B illustrates a query aggregator 230, in accordance with an exemplary aspect of the present invention.
Figure 2C:
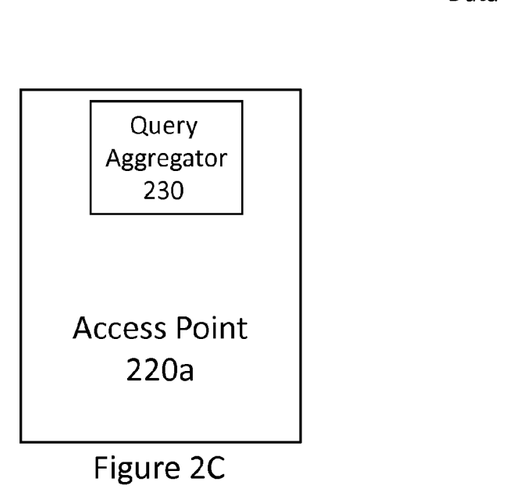
FIGS. 2C and 2D illustrate a query aggregator 230 included in an access point 220 and an intermediate node 240, respectively, in accordance with an exemplary aspect of the present invention.
Figure 2D:
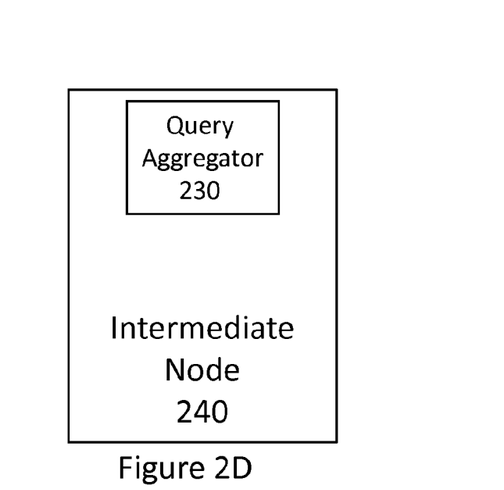

FIG. 2B illustrates a query aggregator 230, in accordance with an exemplary aspect of the present invention, and FIGS. 2C and 2D illustrate a query aggregator 230 included in an access point 220 and an intermediate node 240, respectively, in accordance with an exemplary aspect of the present invention.

As illustrated in FIG. 2B, the query aggregator 230 may include a transmitter/receiver device 232 which receives the plurality of queries from the user equipments and the retrieved data from the query server 245, and transmits the aggregated query to the query server 245 and the filtered retrieved data to the user equipments. The query aggregator 230 may also include a memory device 234 for storing information related to the query aggregation, and a filter 236 for filtering the retrieved data.

The query aggregator 230 may also include an aggregating device 238 (e.g., a processing device such as a microprocessor) which receives the plurality of queries from the transmitter/receiver device 232 and accesses the memory device 234 to perform an aggregation operation (e.g., aggregating the plurality of queries) and forwarding the aggregated query to the transmitter/receiver device 232 which transmits the aggregated query to the query server. The aggregating device 238 may also receive the retrieved data from the transmitter/receiver device 232 and access the filter 236 to filter the retrieved data, and forward the filtered retrieved data to the transmitter/receiver device 232 which transmits the filtered retrieved data to the user equipment.

It is important to emphasize that in the present invention, the query aggregation may be performed (e.g., the query aggregator 230 may be physically located) at any node of the network. In particular, the query aggregator 230 may be included in (or connected to) an access point 220 of the network, an intermediate node 240 of the network, and/or at both an access point 220 and an intermediate node 240 of the network.

Further, the query aggregation operations may be performed separately in different nodes of the network. For example, the query aggregation may include first query aggregation operations which are performed at an access point of the network and second query aggregation operations (e.g., different from the first query aggregation operations) which are performed at an intermediate node of the network. That is, the query aggregator 250 may include a first portion (e.g., transmitter/receiver device 232) formed in an access point 230 and a second portion (e.g., a memory device 234) formed in an intermediate node 240 of the network.

An exemplary aspect of the present invention may include an additional functionality added to a wireless network (e.g., a cellular system) through a server in a node (e.g., a P-GW node), that is application cognizant and optimizes bandwidth consumption for queries by using query aggregation.

The queries may include spatio-temporal queries. The term "spatio-temporal queries" may be defined as queries that are related by having a common location (e.g., being transmitted by user equipments which are served by the same access point in the network) and related by being transmitted (e.g., generated) by user equipments during a common period of time (e.g., within a common time window). However, the invention is not necessarily limited to spatio-temporal queries but may be applied to any plurality of queries which may retrieve overlapping data (e.g., at least a portion of the data retrieved by a first query is the same as at least a portion of the data retrieved by a second query).

An important feature of an exemplary aspect of the present invention is to introduce a query aggregator 230 (e.g., functional box) in a wireless network (e.g., a long term evolution (LTE) system) that serves spatio-temporal queries from several user equipments (UEs) in a bandwidth efficient manner. The query aggregator 230 (e.g., functional box) may be application cognizant and provide a logical gateway between the UEs and the query server.

As illustrated in the exemplary aspect of FIG. 2A, the query aggregator 230 may be connected to an intermediate node 240 (of the network 200) which is located between the access points 220 and the core network 250. For example, the query aggregator 230 may be physically located within the intermediate node 240 (e.g., formed within a housing of a packet-gateway node) or wirelessly connected (e.g., via radio signal) to the intermediate node 240, or connected by a wire to the intermediate node 240, or connected through a communication network (e.g., internet) to the intermediate node 240. For example, the intermediate node 240 may include a mobility-management-entity and the serving-gateway (MME/S-GW) or a packet-gateway node (P-GW). As noted above, the location of the query aggregator is by no means limited to an intermediate node 240, but instead the query aggregator can be located at any node in the network 200. Furthermore, a plurality of query aggregators 240 can be located at a plurality of access points 220 or intermediate nodes 240 in the wireless network 200.

The transmitter/receiver device 232 may be used for wirelessly receiving the plurality of queries transmitted from the access points 220. Alternatively, the queries may be transmitted to the intermediate node 240 which then transmits the query to the query aggregator 230.

The memory device 234 may include, for example, a random access memory (RAM) or magnetic memory, and may store (e.g., and maintain) information such as a time window or spatial location information in which the query aggregator 230 collects the queries issued by UEs 210 and aggregates them. The term "aggregating" may be construed herein to mean collecting and assembling the plurality queries into one aggregated query. The memory device 234 may be included in the query aggregator 230 or may be located separately from the query aggregator 230 and connected to the query aggregator 230 by wire or wireless (e.g., radio signal).

Figure 3:
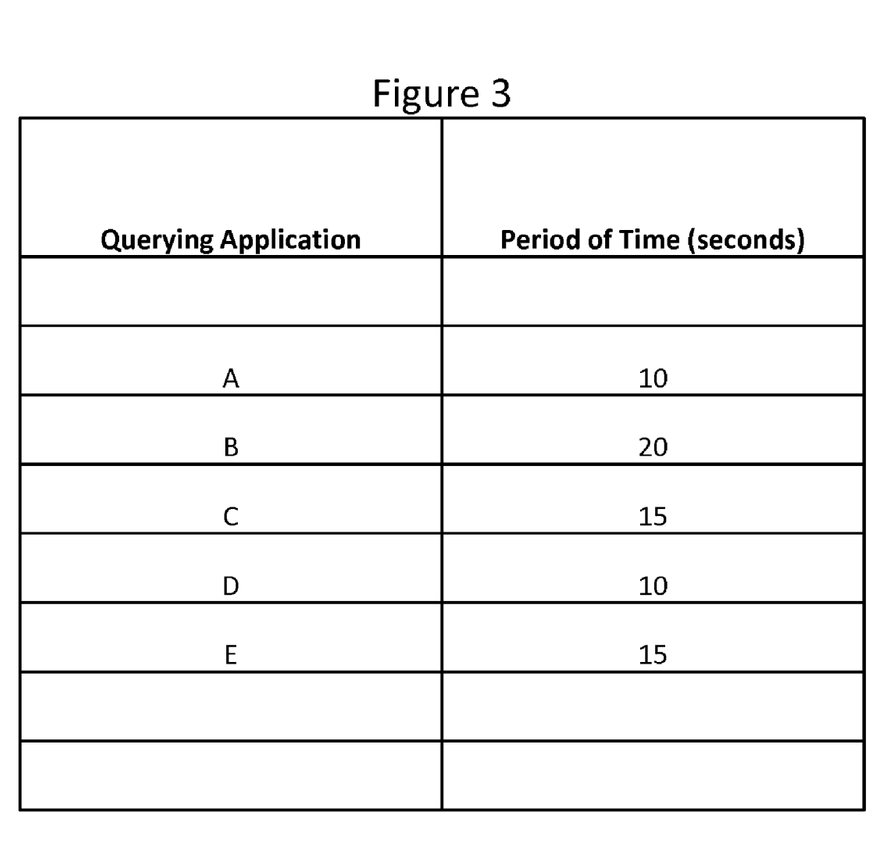
FIG. 3 illustrates a table including information (e.g., querying application information) which may be stored (e.g., accessed by) the query aggregator 230, in accordance with an exemplary aspect of the present invention.

FIG. 3 illustrates a table including information which may be stored by the memory device 234 of the query aggregator 230, in accordance with an exemplary aspect of the present invention. As illustrated in FIG. 3, the memory device 234 of the query aggregator 230 may store a list of querying applications (e.g., a navigation application, etc.) and the Period of Time (e.g., Time Window) over which the query aggregator 230 may aggregate queries generated by that querying application. For example, in FIG. 3, the query aggregator 230 may aggregate queries generated by Querying Application A for 10 seconds, and so on.

The query aggregator 230 may also include a self-updating feature which may allow the information stored by the query aggregator 230, such as the information in the table in FIG. 3, to be updated. Thus, for example, if a user equipment 210 transmits a query to the query aggregator 230, and the query aggregator 230 has no record of the querying application 230, then the query aggregator 230 may assign the querying application a default time window and add the querying application to the table of FIG. 3. Thereafter, the query aggregator 230 may aggregate queries from that querying application by referring to the updated information in the table of FIG. 3.

Figure 4A:
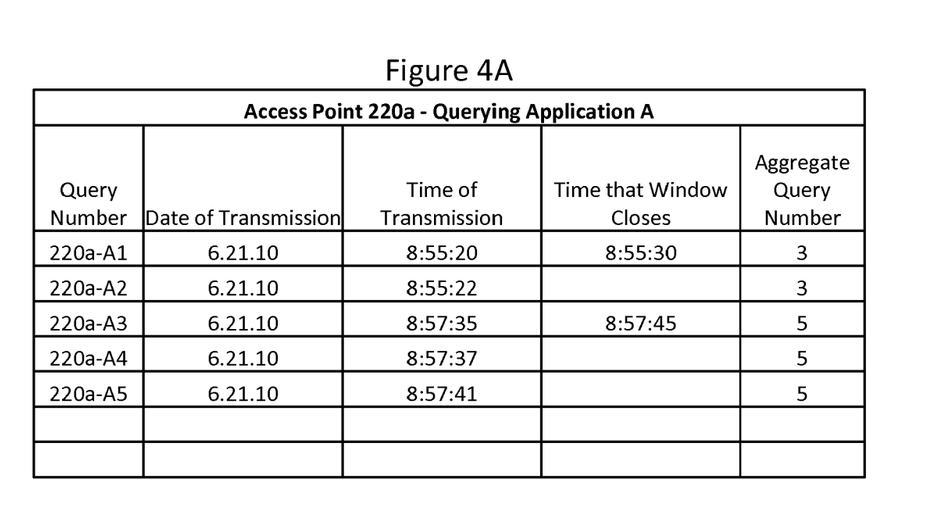
FIGS. 4A-4D illustrate tables including additional information (e.g., querying application information) which may be stored (e.g., accessed by) the query aggregator 230, in accordance with an exemplary aspect of the present invention.
Figure 4B:
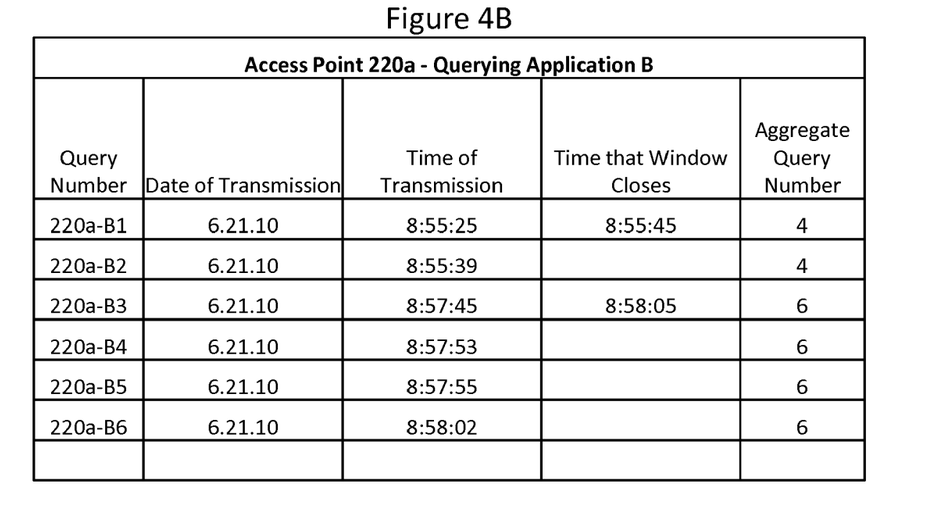
Figure 4C:
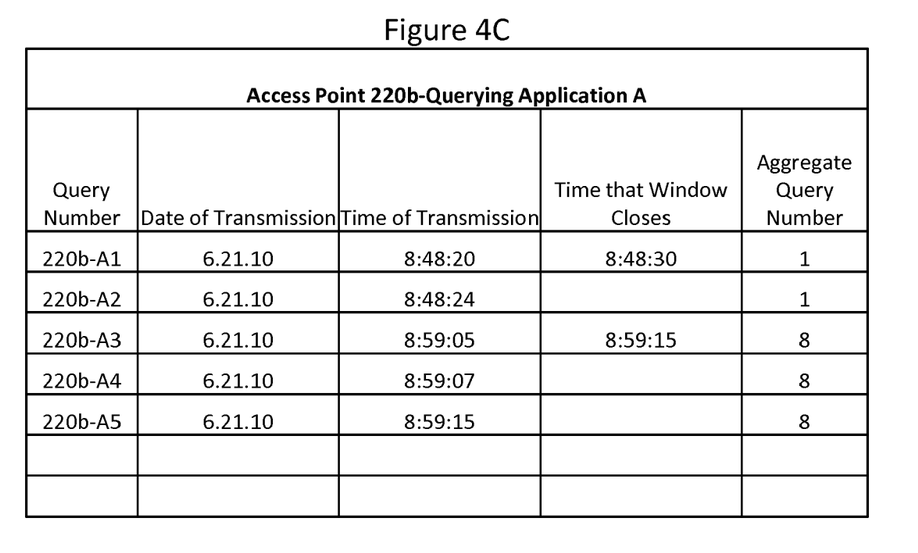
Figure 4D:
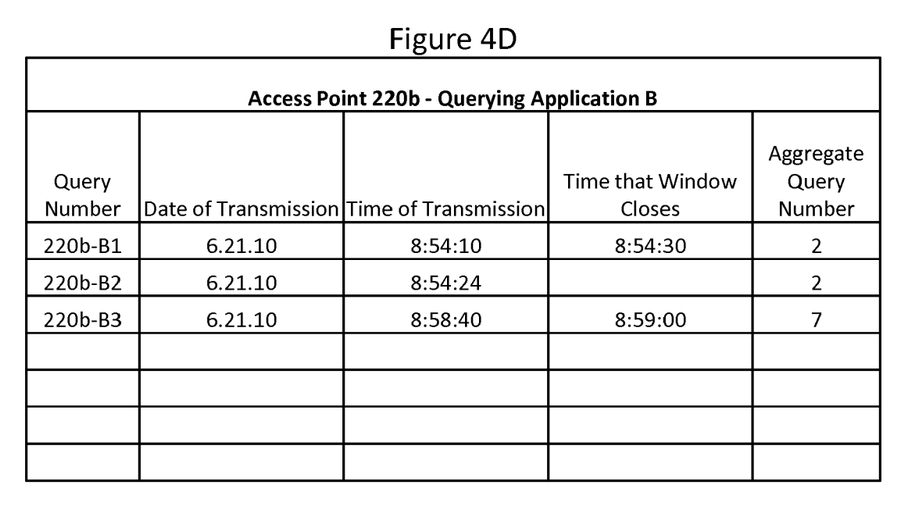

The memory device 234 of the query aggregator 230 may also store and maintain a list of the queries received by each of the access points 220 and for each of the querying applications. FIGS. 4A-4D illustrate additional tables including information which may be stored by the memory device 234 of the query aggregator 230, in accordance with an exemplary aspect of the present invention. For example, FIG. 4A illustrates a table storing a list of queries received by access point 220a which were generated by querying application A, FIG. 4B illustrates a table storing a list of queries received by access point 220a which were generated by querying application B, FIG. 4C illustrates a table storing a list of queries received by access point 220b which were generated by querying application A, and FIG. 4D illustrates a table storing a list of queries received by access point 220b which were generated by querying application B.

For example, in FIG. 4A, at the time 8:55:20 (e.g., hours, minutes, seconds) on Jun. 21, 2010, the query aggregator 230 received query number 220a-A1 which was generated by querying application A. Since the query aggregator 230 has set the period of time (e.g., time window) for querying application A at 10 seconds (e.g., see FIG. 3), the query aggregator 230 sets the time window to close at 8:55:30. Therefore, any query received by the query aggregator 230 through and including the time 8:55:30 which is transmitted from a user equipment being served by access point 220a (i.e., located in a vicinity of access point 220a) and which is generated by querying application A, will be aggregated together with query number 220a-A1 and transmitted to the query server. For example, as illustrated in FIG. 4A, query number 220a-A2 is received by the query aggregator 230 at 8:55:22 and therefore, query number 220a-A2 will be aggregated together with query number 220a-A1. However, query number 220a-A3 was not received by the query aggregator 230 (e.g., transmitted by a user equipment) until 8:57:35 which is after the time window closes and thus, will not be aggregated together with query numbers 220a-A1 and 220a-A2.

The query aggregator 230 may transmit the aggregated query to the query server at the time that the period of time (e.g., time window) closes. For example, as illustrated in FIGS. 4A-4D, aggregated query number 1 which includes query numbers 220b-A1 and 220b-A2 may be transmitted by the query aggregator 230 to the query server at 8:48:30 (i.e., transmitted at the instant that the time window closes or immediately after (e.g., within one second) after the time window closes). Aggregated query number 2 which includes query numbers 220b-B1 and 220b-B2 may be transmitted by the query aggregator 230 at 8:54:30, and so on.

FIGS. 4A-4D illustrate the case in which the aggregated query includes queries generated by user equipments served by the same access point. However, the query aggregator 230 may also aggregate queries generated by different access points based on the proximity of their spatial locations, or by the hierarchy of access points 220 that connect to an intermediate node 240, or by policy based aggregation of queries at several access points 220, or based on a detection of overlap of queries at a plurality of access points 220 or intermediate nodes 240.

Further, FIGS. 4A-4D illustrate the case in which the aggregated query includes queries generated by the same querying application. That is, the query aggregator 230 may identify a querying application for which all queries transmitted within a certain vicinity (e.g., queries transmitted by user equipments served by the same access point) retrieve overlapping data and, therefore, aggregate all queries generated by that querying application by user equipment served by the same access point over a period of time (e.g., the time window for that querying application).

However, the query aggregator 230 may also aggregate queries generated by a plurality of querying applications (e.g., different querying applications) if the query aggregator 230 detects that the queries would retrieve overlapping data. In particular, referring again to FIG. 2B, the query aggregator 230 may include a detector 239 for detecting an overlap of data to be retrieved by the plurality of queries and if an overlap of data is detected, then the plurality of queries are aggregated into an aggregate query which is transmitted to the query server. If the detector 239 does not detect an overlap of data between the plurality of queries, then the query aggregator does not aggregate the plurality of queries, and may transmit the queries separately (e.g., in the order in which the queries were received by the query aggregator 230).

Further, in the case that queries from different querying application are to be aggregated by the query aggregator 230, then the query aggregator 230 may use the time window for the querying application having the least latency tolerance. For example, referring to FIG. 3, if the detector 239 of the query aggregator 230 detects overlapping data to be retrieved in query 1 which is generated by querying application A (having a time window of 10 seconds) and query 2 which is generated by querying application B (having a time window of 20 seconds), then the time window to be used by the query aggregator 230 to aggregate query 1 and query 2 may be 10 seconds. The query aggregator 230 may also be active or dormant depending upon a level of query traffic in the wireless network. That is, the detector 239 of the query aggregator 230 may also detect whether there is congestion at any point (e.g., between the core network 250 and the access points 220) in the wireless backhaul network and if congestion is detected, then the query aggregator 230 may become active and aggregate queries as described above. However, if the detector 239 of the query aggregator 230 does not detect that there is congestion in the network, then the query aggregator 230 may be deactivated so that queries will be transmitted without being aggregated. Alternatively, the query aggregator 230 may be made active or dormant depending upon the time of day, or another parameter.

The query aggregator 230 may also establish a minimum and maximum on the number of queries to be aggregated together into one aggregated query. The minimum and maximum may be based on the querying application generating the queries to be aggregated.

Alternatively, the query aggregator 230 may establish a minimum and maximum on the amount of data to be retrieved by an aggregated query. For example, the query aggregator 230 may include an estimator 237 for keeping a running total of the estimated amount of data to be retrieved by the queries in an aggregated query and when a threshold value is reached, then the query aggregator 230 may not aggregate any further queries into the aggregated query and may immediately transmit the aggregated query to the query server.

Referring again to FIG. 2A, the query server may be included in the core network 250, and the query aggregator 230 may transmit (e.g., issue) the aggregated query to the query server through the intermediate node 240. Alternatively, if the query aggregator 230 is located at the access point 220, the aggregated query may be transmitted to the query server through the access point 220.

Further, the filter 236 of the query aggregator 230 may filter the data retrieved from the query server 245. After the retrieved data is filtered by the filter, the filtered data is then served to individual UEs. The filtering may include separating the responses needed for respective queries made by the user equipment 210, or filtering may include restricting the data served to the user equipment depending on the user subscription level of data access, or filtering may include other parameters such as the granularity (e.g., resolution level) at which data is served.

Beyond this basic functionality, the query aggregator 230 (e.g., a logical box) can perform several other optimizations. In particular, the query aggregator 230 may take into account priority in addition to the time window and spatial proximity (e.g., spatial proximity of user equipments based on the access points that serve them). For example, if a first user on first user equipment has an account with a priority greater than second user on second user equipment, then the query aggregator 230 may aggregate queries giving priority to the first user.

For example, the data stored in the query aggregator 230 may indicate that a first user has a premium account, and a second user has a standard account (i.e., the first user has a greater account priority than the second user). The query aggregator 230 may consider this account priority before determining whether to aggregate the queries of the first and second users. In this case, the query aggregator 230 may aggregate the queries of the second user (e.g., to help relieve congestion in the network) but not aggregate the queries of the first user (e.g., to avoid increasing the time it takes for data to be retrieved in response to the first user's queries).

The query aggregator 230 may also utilize location prediction information available at the intermediate node 240 (e.g., MME/S-GW nodes) in the network 200. The location prediction information may be used by the query aggregator 230 for aggregating periodic queries which are location dependent (e.g., navigation application) and for optimizing the queries to be aggregated based on the spatial proximity of the user equipments 210.

The filter of the query aggregator 230 may also filter the retrieved data based on the UE subscription information. For example, a higher subscription first user on a first user equipment may receive higher resolution data responses than a lower subscription second user on a second user equipment. The query aggregator 230 may also maintain a billing functionality for billing the users of the user equipment, etc.

An important advantage of the present invention is that it may provide increased bandwidth efficiency on the core network (i.e. access to the query server) and on the backhaul links between the access points (e.g., eNodeBs) and the core network (e.g., links between access points and intermediate nodes, and links between intermediate nodes and gateway to the core network). This efficiency may be achieved by reducing the overlapping information being transported over the network links, especially over the backhaul links (e.g., between the access points and the gateway to the core network) which are typical capacity bottlenecks The magnitude of the efficiency achieved by the query aggregator 230 may depend on the latency tolerance of the querying application. For example, a higher latency tolerant application may allow a time window having a greater duration for query aggregation and, hence, a greater bandwidth saving as compared to less latency tolerant application. The magnitude of the efficiency achieved by the query aggregator 230 may also depend on the spatial correlation among the queries of the querying application. For example, a querying application with queries that are highly correlated spatially (e.g., location dependent queries such as navigation maps) will allow for higher aggregation among the plurality of user equipments served by the plurality of spatially close access points, hence, a greater bandwidth saving as compared to a querying application whose queries are less spatially correlated. The exemplary aspects of the present invention may thus provide a mechanism for efficiently serving information-querying and increased capacity of such services in a wireless network (e.g., over 3G/4G cellular networks such as the LTE). Further, the query aggregator 230 may detect a plurality of spatially-located user equipments based on an intensity of spatial correlations among the plurality of queries generated by the plurality of user equipments.

Figure 5:
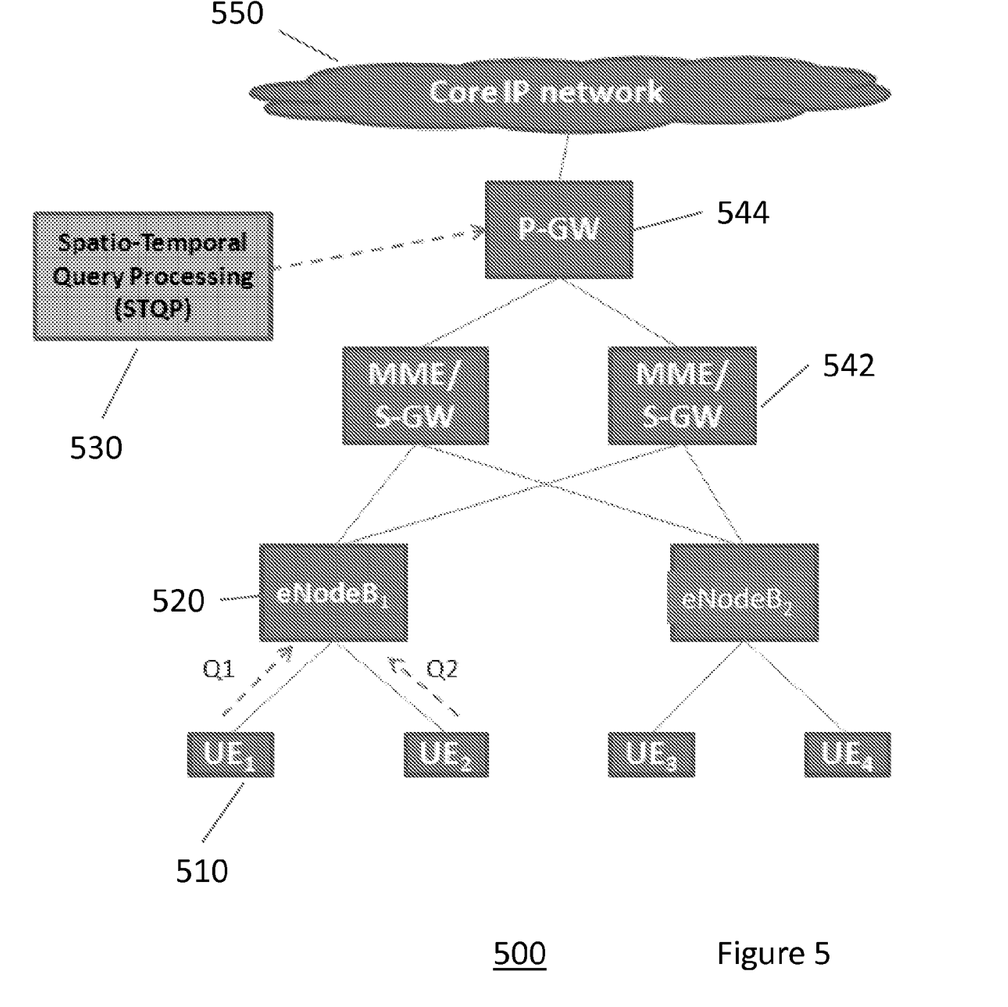
FIG. 5 illustrates a wireless network 500, in accordance with an exemplary aspect of the present invention.

FIG. 5 illustrates a network 500 according to another exemplary aspect of the present invention. As illustrated in FIG. 5, the network 500 includes a Long Term Evolution (LTE) network which includes a plurality of user equipments 510 ($UE_1$ ... $UE_4$) such as a handheld device, laptop, etc., a plurality of eNodeBs 520 (e.g., $eNodeB_1$, $eNodeB_2$, etc.) which represent an access-point or base-station, a plurality of mobility management entity and serving gateway nodes 542 (MME/S-GWs) connected to the plurality of eNodeBs 520 and managing mobility of the UEs 510 across different eNodeBs 520 and also acting as a serving gateway for data, and a packet gateway node 544 (P-GW) connected to the MME/S-GWs 542 and to the Core IP Network 550 and acting as the gateway to the core-IP-network 550. The network 500 also includes a Spatio-Temporal Query Processing (STQP) entity 530 (e.g., similar to query aggregator 230) which aggregates a plurality of queries into an aggregated query.

Each UE 510 may be connected to one eNodeB 520 through the wireless radio link. Several eNodeBs 520 connect to the MME/S-GW node 542. Thus, each MME/S-GW 542 may serve several eNodeBs 520 (e.g., access-points). MME/S-GW 542 then connects to a P-GW 544, which then connects to the core IP network 550 (It should be understood that by "connects" herein, it is intended to mean connection through a wire, fiber-optic link, wireless or any other communication technology).

Thus, an important feature of the present invention may include a functional box which is shown on the left in FIG. 5 as a spatio-temporal query processing (STQP) entity 530. The STQP entity 530 can be a part of either the eNodeB 520 or the MME/S-GW node 542 or the P-GW node 544 depending on the actual implementation, and it provides the functionality to enable query aggregation among UEs 510. The STQP entity 530 may provide a logical gateway between the UEs 510 and the Query Server to which the STQP 530 connects through the core IP network 550.

The STQP entity 530 maintains a periodic time window. The duration (e.g., size) of this time window depends on the latency tolerance of the querying application and hence different time windows can be maintained for different applications. Queries issued by UEs 510 within the time window are aggregated and the aggregated query is issued to the query server for data retrieval over the core IP network 550. The STQP entity 530 may also maintain a list of spatially close eNodeB's 520 for query application with spatial correlation among the queries, and aggregate queries issued by the UEs 510 that are served by this list.

The STQP 530 may include a filter for filtering the retrieved data depending on various factors such as the individual queries of the UEs 510, the subscription levels of the UEs which determines the access control on the information, granularity (e.g., resolution) of the data access, etc. The filtered data is then served to the respective UEs 510.

To further optimize query retrieval, the STQP entity 530 (e.g., in addition to the time window) may maintain the spatial location of the UEs 510 that are currently part of the network hierarchy below the corresponding P-GW 544 or the MME/S-GW node 542 or the eNodeB 520, depending on the location of the STQP in an actual implementation. Using data from MME/S-GW node 542, the STQP entity 530 can also obtain predictions of the spatial locations of the UEs 510. The current location information of the UEs 510 and the prediction of the STQP entity 530 may be used in conjunction with the querying application to predict spatio-temporal queries and pre-fetch/anticipate data retrieval, or optimize future query aggregations. Such enhanced optimization may reduce latency or increase the bandwidth saving efficiency of the query aggregation process.

Figure 6:
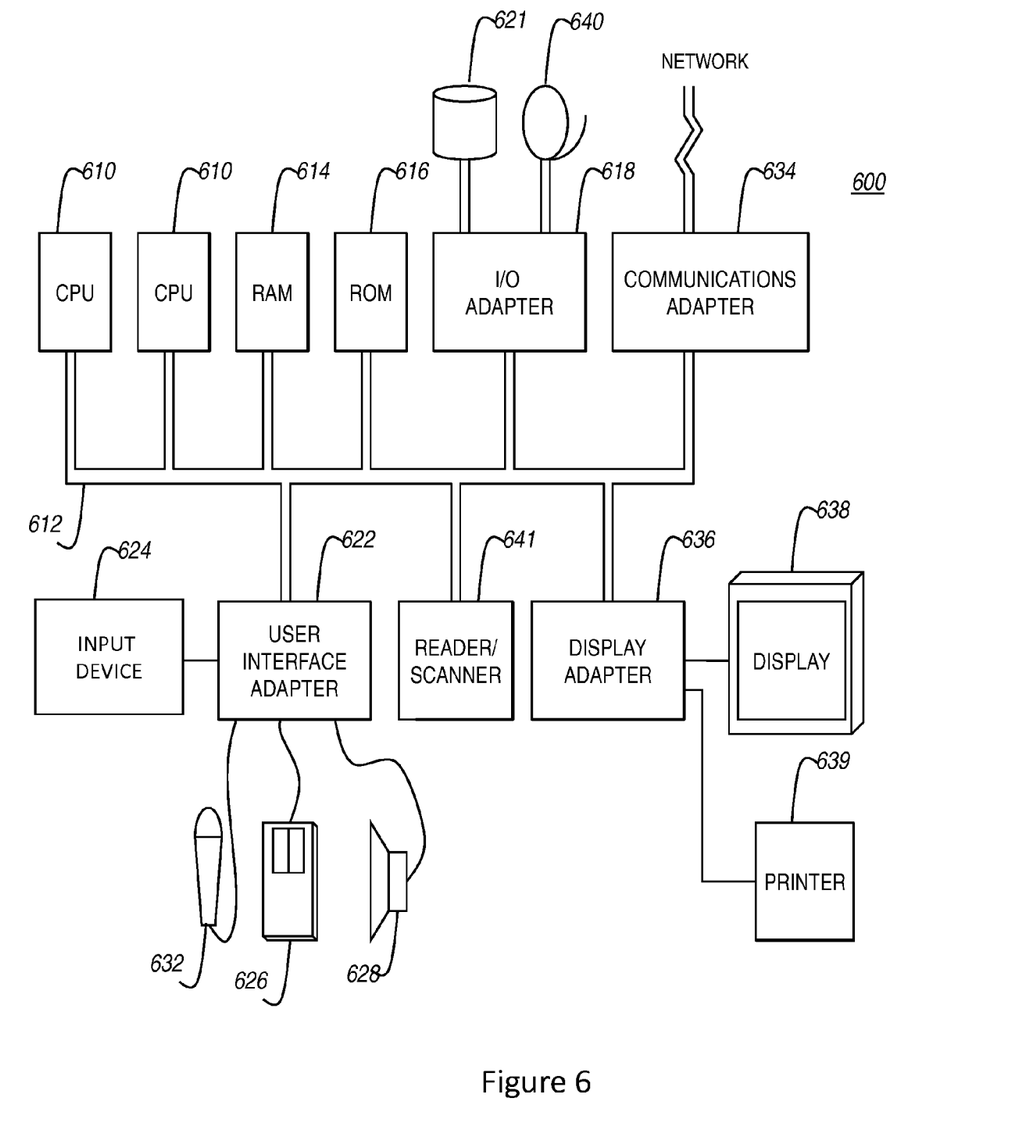
FIG. 6 illustrates a typical hardware configuration 600 that may be used to implement the network and method (e.g., network 200, network 500, or method 100), in accordance with an exemplary aspect of the present invention.
Figure 7:
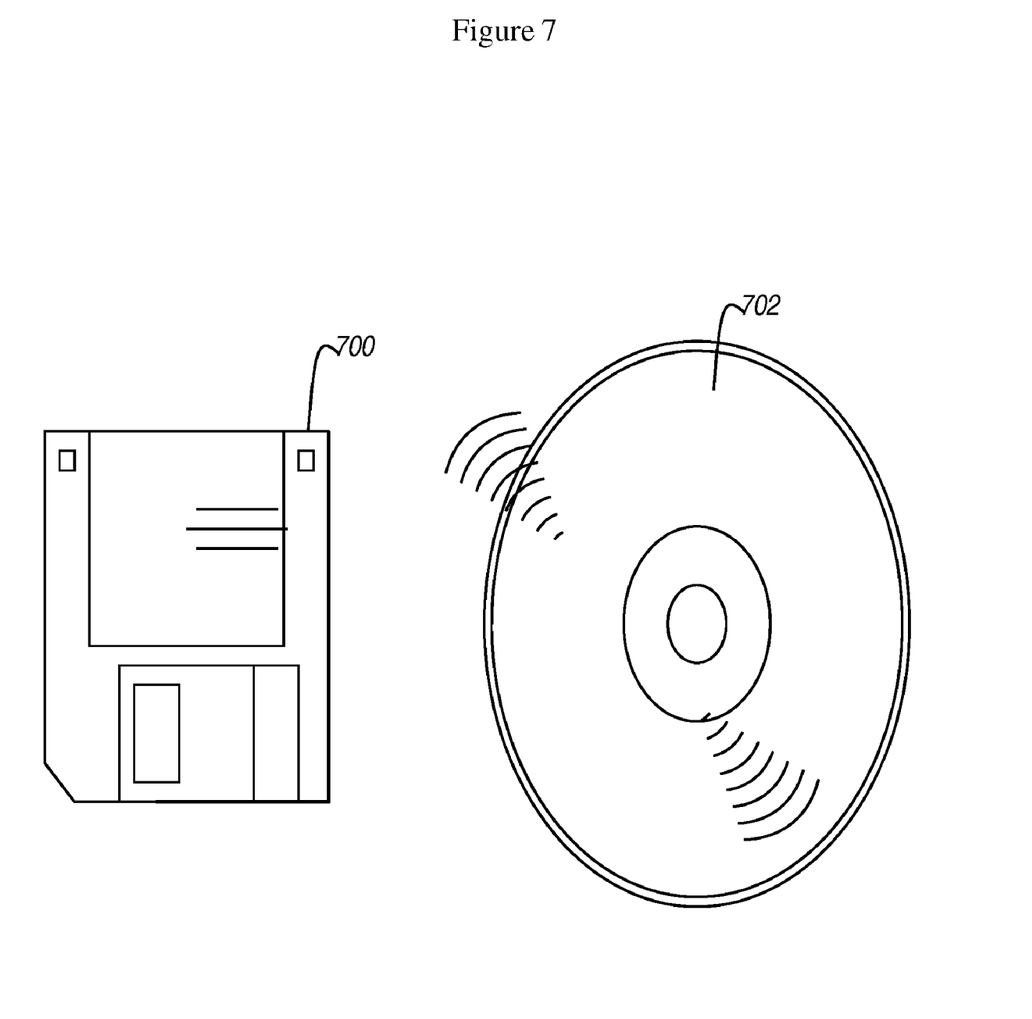
FIG. 7 illustrates a magnetic data storage diskette 700 and compact disc (CD) 702 that may be used to store instructions for performing the inventive method of the present invention (e.g., method 100), in accordance with an exemplary aspect of the present invention.

Referring now to FIG. 6, system 600 illustrates a typical hardware configuration which may be used for implementing the network and method of the present invention (e.g., network 200, network 400, method 100 and method 500). The configuration has preferably at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 628, speaker 628, microphone 632, pointing stick 627 and/or other user interface device to the bus 612), a communication adapter 634 for connecting an information handling system to a data processing network, the Internet, an Intranet, an area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 611 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 or compact disc 702 (FIG. 7), directly or indirectly accessible by the CPU 611.

Whether contained in the computer server/CPU 611, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may include software object code, compiled from a language such as C, C++, etc.

With its unique and novel features, the present invention provides a method of transmitting a query in a wireless network which may optimize bandwidth consumption for queries (e.g., spatio-temporal queries) using query aggregation.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of transmitting a query in a wireless network, comprising:
   receiving a plurality of queries from a plurality of user equipments, the plurality of user equipments comprising a plurality of spatially-located user equipments;
   detecting the plurality of spatially-located user equipments based on an intensity of spatial correlations among the plurality of queries generated by the plurality of user equipments;
   aggregating the plurality of queries at a node of the network, the node including at least one of an access point of the network and an intermediate node of the network, the aggregating of the plurality of queries comprising aggregating the plurality of queries over the plurality of spatially-located user equipments; and
   transmitting the aggregated plurality of queries to a query server.

2. The method of claim 1, further comprising:
   retrieving data in response to the aggregated plurality of queries; and
   filtering the retrieved data and serving the filtered data to a user equipment of the plurality of user equipments.

3. The method of claim 1, wherein the aggregating of the plurality of queries is based on an intensity of congestion in the network.

4. The method of claim 1, wherein the aggregating of the plurality of queries comprises aggregating the plurality of queries over a period of time.

5. The method of claim 4, wherein the aggregating of the plurality of queries comprises aggregating the plurality of queries based on account priority and the period of time to optimize the aggregating of the plurality of queries.

6. The method of claim 4, further comprising:
   detecting a plurality of querying applications which generate the plurality of queries; and
   setting the period of time based on the plurality of querying applications.

7. The method of claim 6, wherein the setting of the period of time comprises setting the period of time based on a latency tolerance among the plurality of querying applications.

8. The method of claim 1, wherein the aggregating of the plurality of queries comprises aggregating the plurality of queries based on location prediction information to optimize the aggregating of the plurality of queries.

9. A wireless network, comprising:
   a plurality of user equipments for transmitting a plurality of queries, the plurality of user equipments comprising a plurality of spatially-located user equipments;
   a query aggregator which aggregates the plurality of queries at a node of the network, the node including at least one of an access point of the network and an intermediate node of the network, the query aggregator aggregating the plurality of queries over the plurality of spatially-located user equipments; and
   a query server which receives the aggregated plurality of queries,
   wherein the query aggregator detects the plurality of spatially-located user equipments based on an intensity of spatial correlations among the plurality of queries generated by the plurality of user equipments.

10. The wireless network of claim 9, wherein the access point receives the plurality of queries and the intermediate node serves as a connection for the access point, and the query aggregator aggregates the plurality of queries over a period of time.

11. The wireless network of claim 10, wherein the plurality of queries are generated by a plurality of querying applications, and the query aggregator detects the plurality of querying applications and sets the period of time based on the plurality of querying applications.

12. The wireless network of claim 10, wherein the query aggregator sets the period of time based on a latency tolerance of the plurality of querying applications.

13. The wireless network of claim 9, wherein the query server retrieves data in response to the aggregated plurality of queries and transmits the retrieved data to the query aggregator, and the query aggregator filters the retrieved data and serves the filtered data to a user equipment of the plurality of user equipments.

14. The wireless network of claim 9, wherein the query aggregator aggregates the plurality of queries based on an intensity of congestion in the network.

15. The wireless network of claim 9, wherein the query aggregator aggregates the plurality of queries based on account priority and the period of time and based on location prediction information to optimize the aggregating of the plurality of queries.

16. The wireless network of claim 9, further comprising:
a core network including the query server,
wherein the intermediate node comprises a plurality of intermediate nodes including a packet-gateway node which serves as a gateway to the core network.

17. The wireless network of claim 16, wherein the plurality of intermediate node further comprises a mobility management entity and serving gateway node which is connected to the access point and to the packet gateway node, and
wherein the mobility management entity and serving gateway node manages a mobility of the plurality of user equipments across the plurality of access points and serves as a serving gateway for data.

18. The wireless network of claim 17, wherein the network comprises a Long Term Evolution (LTE) based network, and the access point comprises an eNodeB.

19. A method of transmitting a query in a wireless network, comprising:
receiving a plurality of queries from a plurality of user equipments, the plurality of user equipments comprising a plurality of spatially-located user equipments;
detecting the plurality of spatially-located user equipments based on an intensity of spatial correlations among the plurality of queries generated by the plurality of user equipments;
setting a period of time based on a latency of the querying application;
aggregating the plurality of queries at a node of the network over the period of time, the node including at least one of an access point of the network and an intermediate node of the network, the aggregating of the plurality of queries comprising aggregating the plurality of queries over the plurality of spatially-located user equipments;
transmitting the aggregated plurality of queries to a query server;
retrieving data in response to the aggregated plurality of queries and transmitting the retrieved data; and
filtering the retrieved data and serving the filtered data to the plurality of user equipments.

20. A wireless network, comprising:
a plurality of user equipments for transmitting a plurality of queries, the plurality of user equipments comprising a plurality of spatially-located user equipments;
a plurality of access points including an access point which receives the plurality of queries;
a query aggregator for detecting a querying application which generates a query of the plurality of queries, setting a period of time based on a latency tolerance of the querying application, and aggregating the plurality of queries at a node of the network over the period of time, the query aggregator aggregating the plurality of queries over the plurality of spatially-located user equipments, and the node including at least one of an access point in the plurality of access points and an intermediate node of the network, the intermediate node comprising:
a mobility management entity and serving gateway node which is connected to the plurality of access points and receives the plurality of queries from the access point; and
a packet-gateway node which is connected to the mobility management entity and serving gateway node; and
a core network including a query server which receives the aggregated plurality of queries from the packet-gateway node which serves as a gateway to the core network, the query server retrieving data in response to the aggregated plurality of queries and transmitting the retrieved data to the query aggregator which filters the retrieved data and serves the filtered data to the plurality of user equipments,
wherein the query aggregator detects the plurality of spatially-located user equipments based on an intensity of spatial correlations among the plurality of queries generated by the plurality of user equipments.

21. A programmable storage medium tangibly embodying a program of machine-readable instructions executable by a digital processing apparatus to perform a method of transmitting a query in a wireless network, the method comprising:
receiving a plurality of queries from a plurality of user equipments, the plurality of user equipments comprising a plurality of spatially-located user equipments;
detecting the plurality of spatially-located user equipments based on an intensity of spatial correlations among the plurality of queries generated by the plurality of user equipments;
aggregating the plurality of queries at a node of the network, the node including at least one of an access point of the network and an intermediate node of the network, the aggregating of the plurality of queries comprising aggregating the plurality of queries over the plurality of spatially-located user equipments; and
transmitting the aggregated plurality of queries to a query server.

* * * * *